(12) United States Patent
Wang et al.

(10) Patent No.: US 11,094,081 B2
(45) Date of Patent: Aug. 17, 2021

(54) SEARCHING VIRTUAL CONTENT INFORMATION

(71) Applicant: LENOVO (Singapore) PTE. LTD., New Tech Park (SG)

(72) Inventors: Song Wang, Cary, NC (US); Jian Li, Chapel Hill, NC (US); Ming Qian, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 225 days.

(21) Appl. No.: 16/367,194

(22) Filed: Mar. 27, 2019

(65) Prior Publication Data
US 2020/0311976 A1   Oct. 1, 2020

(51) Int. Cl.
*G06T 7/73* (2017.01)
*G06T 7/564* (2017.01)
*G06F 16/44* (2019.01)
*G06F 16/41* (2019.01)

(52) U.S. Cl.
CPC ............ *G06T 7/75* (2017.01); *G06F 16/41* (2019.01); *G06F 16/44* (2019.01); *G06T 7/564* (2017.01); *G06T 2207/20116* (2013.01); *G06T 2207/30242* (2013.01)

(58) Field of Classification Search
CPC . G06T 7/75; G06T 7/564; G06T 2207/20116; G06T 2207/30242; G06F 16/44; G06F 16/41; G06F 16/58
See application file for complete search history.

(56) References Cited

U.S. PATENT DOCUMENTS

| 10,726,597 | B1* | 7/2020 | Chang | G06T 11/60 |
| 2012/0206452 | A1* | 8/2012 | Geisner | H04S 7/304 |
| | | | | 345/419 |
| 2016/0217590 | A1* | 7/2016 | Mullins | G06T 7/40 |
| 2018/0350144 | A1* | 12/2018 | Rathod | G06Q 20/3276 |
| 2020/0302681 | A1* | 9/2020 | Totty | G06T 7/74 |

\* cited by examiner

*Primary Examiner* — Phuoc Tran
(74) *Attorney, Agent, or Firm* — Kunzler Bean & Adamson

(57) ABSTRACT

For searching virtual content information, a processor searches the virtual content information including a virtual object contour. The processor further retrieves an image based on the virtual content information.

18 Claims, 8 Drawing Sheets

SEARCHING VIRTUAL CONTENT INFORMATION

FIELD

The subject matter disclosed herein relates to virtual content information and more particularly relates to searching virtual content information.

BACKGROUND

A scene may include virtual content.

BRIEF SUMMARY

An apparatus for searching virtual content information is disclosed. The apparatus includes a processor and a memory. The memory stores code executable by the processor. The processor searches the virtual content information comprising a virtual object contour. The processor further retrieves an image based on the virtual content information. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
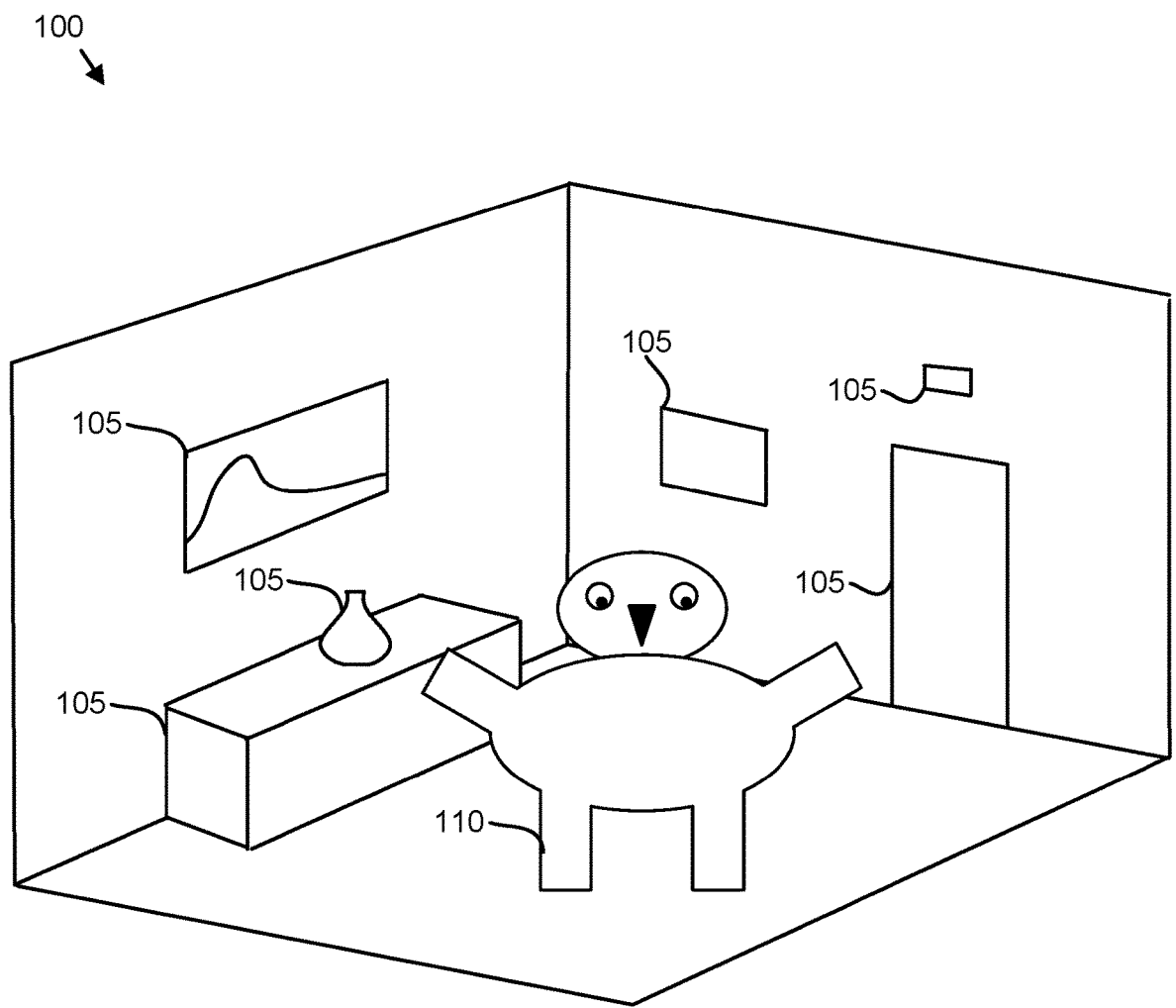
FIG. 1A is a perspective drawing illustrating one embodiment of scene with real objects and virtual content.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a perspective drawing illustrating one embodiment of scene 100. The scene 100 may be presented in by an electronic device. The scene 100 may include both real objects 105 and virtual content 110. In a certain embodiment, the scene 100 may only include the virtual content 110. In the depicted embodiment, the virtual content 110 is a virtual object. The virtual content 110 may also be augmented information including text, audio, and/or video that are presented within the scene 100.

Figure 1B:
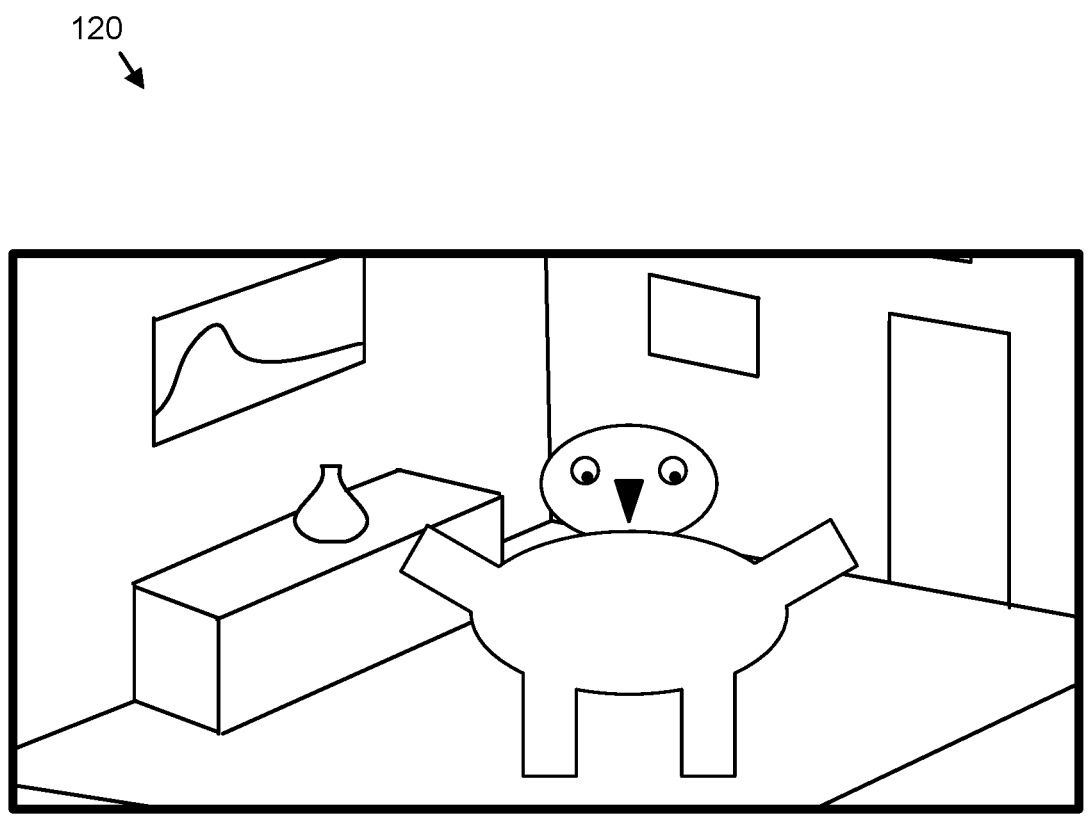
FIG. 1B is a drawing illustrating one embodiment of a screenshot of a scene.

FIG. 1B is a drawing illustrating one embodiment of a screenshot 120 of the scene 100 of FIG. 1A. The screenshot 120 may be captured from the scene 100 and stored as a data structure for the image of the screenshot 120 in a memory. In the depicted embodiment, the screenshot 120 includes both the real objects 105 and the virtual content 110.

Unfortunately, the virtual content 110 includes information about the image of the screenshot 120 that currently is not stored with other information about the scene 100 and/or screenshot 120. The embodiments record virtual content information along with the image of the screenshot 120. In addition, the embodiments may search for and retrieve the image based on the virtual content information as will be described hereafter. As a result, the functioning of an electronic device and/or computer that records the image and searches for and retrieves the image is enhanced.

Figure 2:
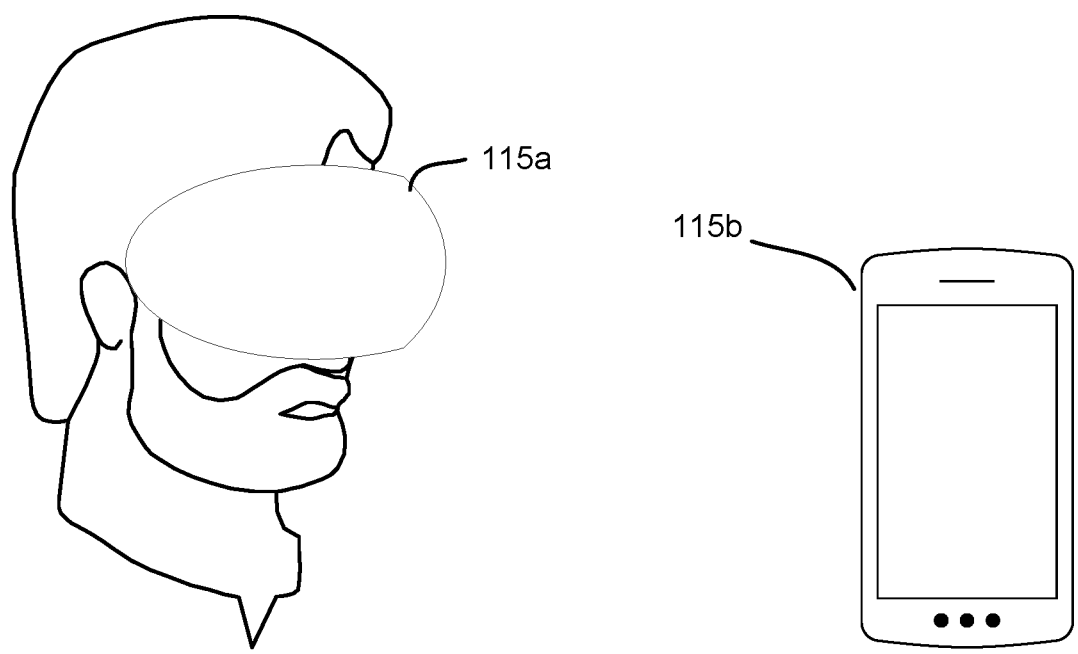
FIG. 2 is drawings illustrating embodiments of electronic devices.

FIG. 2 is drawings illustrating embodiments of electronic devices 115. In the depicted embodiment, the electronic devices 115 include a virtual-reality electronic device 115a and a mobile telephone electronic device 115b. The electronic devices 115 may present a scene 100 such as the scene 100 of FIG. 1A. In addition, the electronic devices 115 may record a screenshot 120 of the scene 100 that is stored as an image. The embodiments record the virtual content information with the image. A user may subsequently desire to search for and retrieve the image of the screenshot 120. The image may be identified and retrieved based on the virtual content information as will be described hereafter.

Figure 3A:
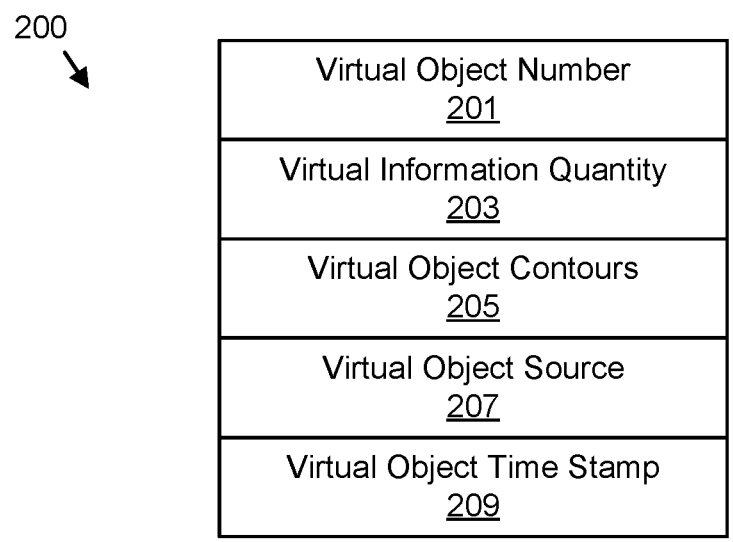
FIG. 3A is a schematic block diagram illustrating one embodiment of virtual content information.

FIG. 3A is a schematic block diagram illustrating one embodiment of the virtual content information 200. The virtual content information 200 may be organized as a data structure in a memory. In one embodiment, the virtual content information 200 is recorded with the image. In the depicted embodiment, the virtual content information 200 includes a virtual object number 201, a virtual information quantity 203, virtual object contours 205, a virtual object source 207, and a virtual object timestamp 209.

The virtual object number 201 may record a number of virtual content 110 such as virtual object virtual content 110 in the image. For example, each instance of virtual content 110 may be counted. In a certain embodiment, one instance of virtual content 110 includes all virtual objects that share a parent node. In one embodiment, each distinct instance of virtual content 110 visible in the image is counted. A distinct instance of virtual content 110 may be separated from other virtual content 110 by real objects 105 and/or partially obscured by other virtual content 110.

The virtual information quantity 203 may record an amount of virtual content 110 in the image. The amount of virtual content 110 may be a number of pixels in the image. In addition, the virtual information quantity 203 may record a percentage of virtual content 110 in the image. The percentage of virtual content 110 may be a ratio of virtual pixels to total pixels in the image. Pixels of real objects 105 may not be included in the tally of virtual pixels.

The virtual object contours 205 may describe contours of the virtual content 110. In one embodiment, the contours of the virtual content 110 are a two-dimensional contour that outline the virtual content 110 in the image. The two-dimensional contour may be searched for in order to identify an image with a specific rendition of the virtual content 110. For example, the two-dimensional contour may be used to identify virtual content 110 that was captured from a specified point of view.

In addition, the contours of the virtual content 110 may be a three-dimensional contour of the virtual content 110. The three-dimensional contour may be searched for in order to identify any image with a rendition of the virtual content 110. For example, the three-dimensional contour may be used to identify virtual content 110 that was captured from any point of view.

The virtual object source 207 may record a source of the virtual content 110. The virtual objects source 207 may record a pointer to a data structure from which the virtual content 110 was generated in the scene 100. The pointer may be a Universal Resource Locator (URL), database index, object identifier, and the like.

The virtual object timestamp 209 may record when the virtual content 110 is added to the scene 100 and/or screenshot 120. In one embodiment, the virtual object timestamp 209 includes a listing of frames that include the virtual content 110 in a video screenshot 120.

Figure 3B:
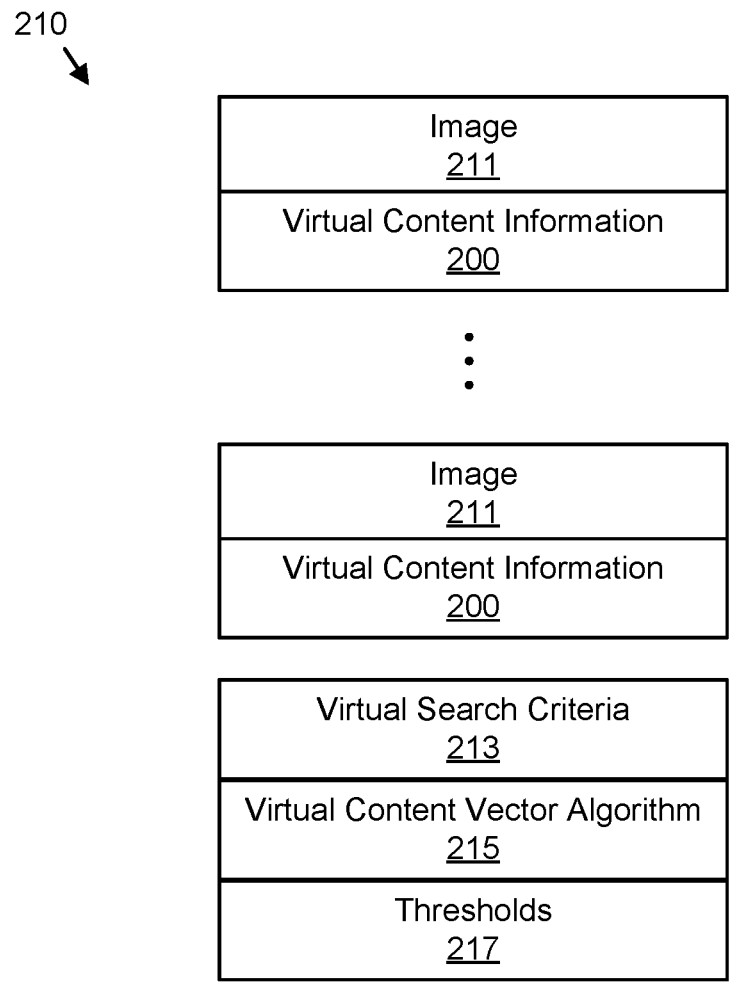
FIG. 3B is a schematic block diagram illustrating one embodiment of electronic device data.

FIG. 3B is a schematic block diagram illustrating one embodiment of electronic device data 210. The electronic device data 210 may be organized as a data structure in a memory. In one embodiment, the electronic device data 210 includes a plurality of images 211 and corresponding virtual content information 200, virtual search criteria 213, a virtual content vector algorithm 215, and one or more thresholds 217.

The image 211 records the screenshot 120. The image 211 may be a still image 211. In addition, the image 211 may be a video image 211.

The virtual search criteria 213 may specify one or more of the virtual object number 201, virtual information quantity 203, virtual object contours 205, virtual objects source 207, virtual object timestamp 209, and an image 211, including one or more image properties.

The virtual content vector algorithm 215 may be employed to vectorize the virtual content information 200 and/or the virtual search criteria 213. The thresholds 217 may store thresholds, ranges, specified numbers, and values for making determinations.

Figure 4:
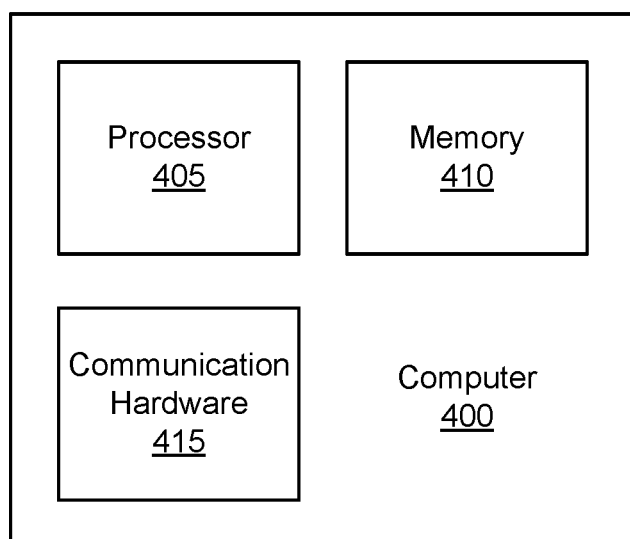
FIG. 4 is a schematic block diagram illustrating one embodiment of a computer.

FIG. 4 is a schematic block diagram illustrating one embodiment of a computer 400. The computer 400 may be embodied in the electronic device 115. Alternatively, the computer 400 may communicate with the electronic device 115. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices.

Figure 5:
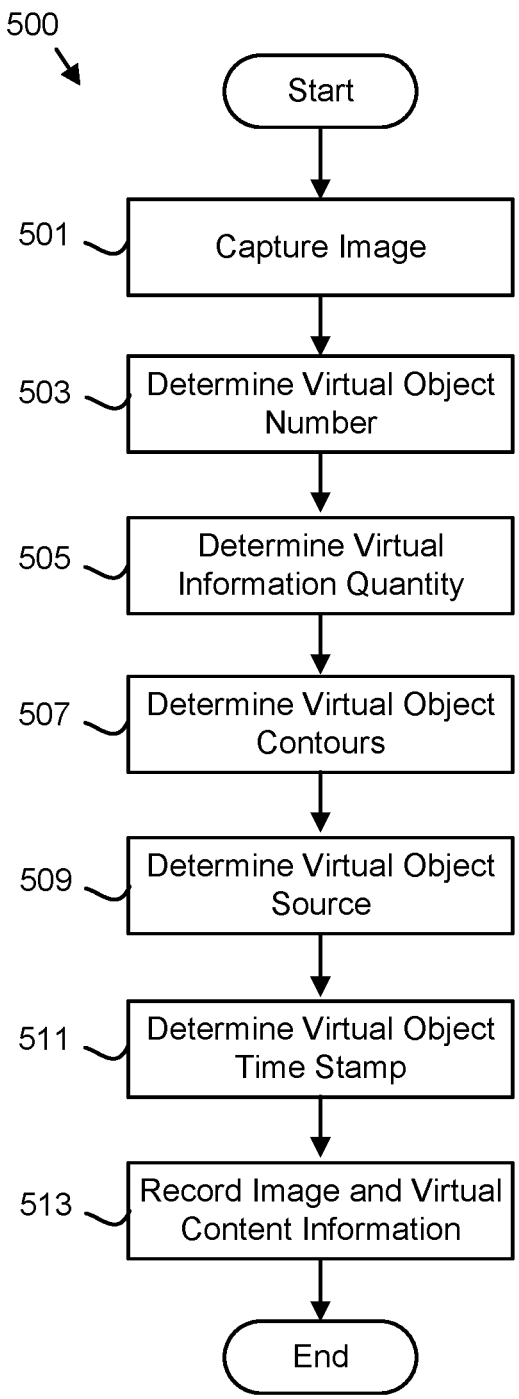
FIG. 5 is a schematic flow chart diagram illustrating one embodiment of a virtual content information generation method.

FIG. 5 is a schematic flow chart diagram illustrating one embodiment of a virtual content information generation method 500. The method 500 may determine the virtual content information 200 for a screenshot 120. In addition, the method 500 may record the image 211 and the virtual content information 200. The method 500 may be performed by the processor 405.

The method 500 starts, and in one embodiment, the processor 405 captures 501 the image 211 of the screenshot 120. The processor 405 may read the image 211 from a display of the electronic device 115. In addition, the image 211 may be received from an electronic device 115.

The processor 405 may determine 503 the virtual object number 201. In one embodiment, the processor 405 identifies a number of topmost parent nodes of the virtual content 110 in the screenshot 120. In addition, the processor 405 may count each instance of virtual content 110 that is surrounded by pixels of real content 105 and/or partially obscured by other virtual content 110 as one of the virtual object number 201.

The processor 405 may determine 505 the virtual information quantity 203. The processor 405 may identify the source of each pixel of the screenshot 120 and/or image 211 as either from real objects 105 or from virtual content 110. The virtual information quantity 203 may be the number of pixels from the virtual content 110. In addition, the virtual information quantity 203 may be a ratio of the pixels from virtual content 110 to total pixels in the image 211.

The processor 405 may determine 507 the virtual object contours 205. In one embodiment, the processor 405 identifies each pixel of an instance of virtual content 110. The processor 405 may further identify each virtual content pixel that is adjacent to a pixel of a real object 105 as a contour pixel. In one embodiment, the contour pixels define the virtual object contours 205.

In addition, the processor 405 may fit a spline through the contour pixels. The spline may define the virtual object contours 205.

In one embodiment, the processor 405 identifies a three-dimensional model that was used to generate the virtual content 110 using the virtual object source 207. The processor 405 may further calculate a three-dimensional contour model of the virtual content 110 from the three-dimensional model of the virtual object source 207. The three-dimensional contour model may have a specified maximum feature resolution. In one embodiment, the three-dimensional contour model may be reduced to no more than a specified number of geometric shapes as an approximate model. The approximate model contour model further define the virtual object contours 207.

The processor 405 may determine 509 the virtual object source 207. In one embodiment, the processor determines 509 the virtual object source 207 by identifying the pointer, index, and/or identifier used to generate the virtual content 110.

The processor 405 may determine 511 the virtual object timestamp 209. The virtual object timestamp 209 may be recorded when the virtual content 110 is first added to the scene 100. In addition, the virtual object timestamp 209 may record each time the virtual content 110 is re-rendered within the scene 100. In one embodiment, the virtual object timestamp 209 records each video frame of the virtual content 110 in the image 211 of the screenshot 120.

The processor 405 may record 513 the image 211 and the virtual content information 200 and the method 500 ends. The image 211 and virtual content information 200 may be recorded to the memory 410. The virtual content information 200 allows the image 211 to be searched for the virtual content 110.

Figure 6:
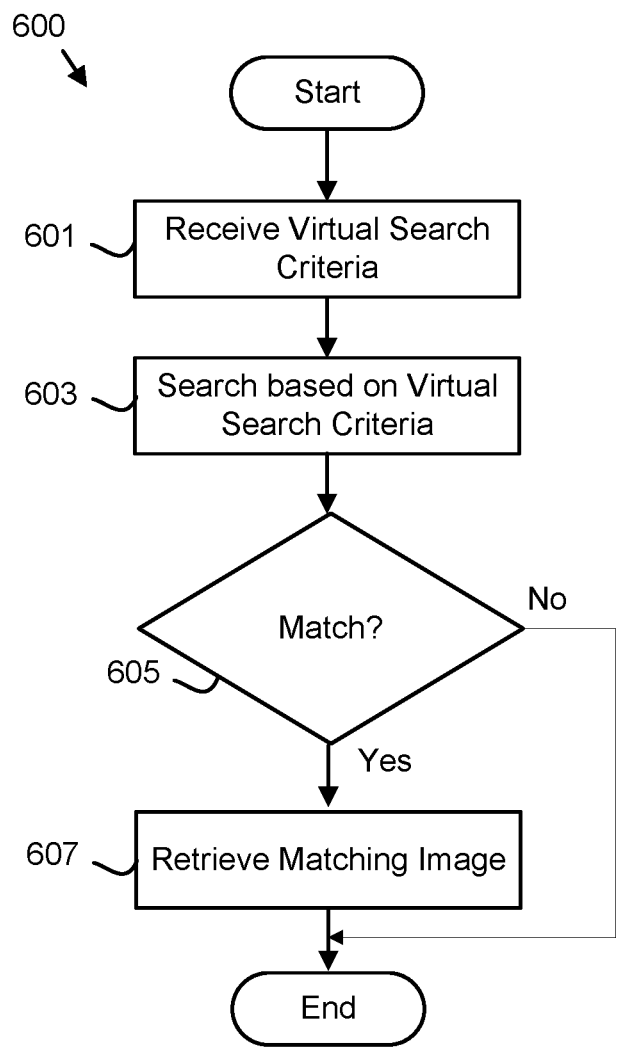
FIG. 6 is a schematic flow chart diagram illustrating one embodiment of a virtual content information search method.

FIG. 6 is a schematic flow chart diagram illustrating one embodiment of a virtual content information search method 600. The method 600 may search the virtual content information 200 for an image 211 with specified virtual content 110. In addition, the method 600 may retrieve images 211 that match virtual search criteria 213. The method 600 may be performed by the processor 405.

The method 600 starts, and in one embodiment, the processor 405 receives 601 the virtual search criteria 213. The virtual search criteria 213 may include the virtual object contour 205. In a certain embodiment, the virtual search criteria 213 comprises one or more instances of the virtual object number 201, the virtual information quantity 203, the virtual object contours 205, the virtual object source 207, and the virtual object timestamp 209.

In one embodiment, the virtual search criteria 213 comprises the approximate model of the virtual object contour 205. The approximate model may define one or more geometric shapes of the virtual object contour 205. For example, the approximate model for the virtual content 110 of FIGS. 1A-B may comprise two spheres and four cylinders. The approximate model may be generated from search image or a search model In one embodiment, the virtual search criteria 213 comprises an approximate outline of the virtual object contour 205. A user may trace the approximate outline of the virtual object contour 205 on a display. In addition, the approximate outline may be generated from a search image.

The processor 405 may further search 603 the virtual content information 200 of the images 211 based on the virtual search criteria 213. In one embodiment, the virtual content information 200 and the virtual search criteria 213 are vectorized using the virtual content vector algorithm 215. The virtual content vector algorithm 215 may generate a vector of binary values that represent characteristics of the virtual content information 200 or the virtual search criteria 213. Table 1 shows one simplified example of a vector.

TABLE 1

| 0111000010100001000000100000001011101 |
| --- |

In one embodiment, an inner product space IPS is generated from the vector A of the virtual content information 200 of an image 211 and the vector B of the virtual search criteria 213 as shown in Equation 1.

$$IPS = A \cdot B \qquad \text{Equation 1}$$

In one embodiment, the similarity S of the virtual content information 200 and the virtual search criteria 213 is calculated using Equation 2.

$$S = \frac{A \cdot B}{\|A\|\|B\|} \qquad \text{Equation 2}$$

The processor 405 may determine 605 if there is a match between the virtual content information 200 and the virtual search criteria 213. The virtual content information 200 with the highest similarity may be selected as the match. In a certain embodiment, the virtual content information 200 with the highest similarity and that exceeds a match threshold may be determined 605 to match the virtual search criteria 213.

In one embodiment, a matching image 211 comprises virtual content information 200 that matches the virtual search criteria 213. In a certain embodiment, the matching image 211 comprises virtual content information 200 that matches a specified portion of the virtual search criteria 213. In one embodiment, each image 211 with virtual content information 200 that exceeds a match threshold of the thresholds 217 may be determined 605 to match the virtual search criteria 213.

If no virtual content information 200 matches the virtual search criteria 213, the method 600 ends. If virtual content information 200 matches the virtual search criteria 213, the processor 405 may retrieve 607 the matching image 211 based on the virtual content information 200 and the method 600 ends. The retrieved image 211 may comprise virtual content information 200 that matches a specified portion of the virtual search criteria 213.

The embodiments generate the virtual content information 200 for the scene 100, screenshot 120, and/or image 211. The virtual content information 200 may be efficiently and rapidly searched for the virtual search criteria 213, allowing the desired image 211 to be retrieved. As a result, the performance of the computer 400 and/or electronic device 115 is enhanced.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:

determine a source of each pixel of an images as from a real object or virtual content,
   wherein the image comprises both real objects and virtual content;
determine a virtual object contour for the virtual content, wherein each virtual object contour is a model that outlines the virtual content in the image and comprises no more than a specified number of geometric shapes;
search virtual content information for a plurality of stored images using virtual search criteria, wherein the virtual content information and virtual search criteria are vectors with a binary value asserted for each geometric shape of a corresponding virtual object contour; and
retrieve a stored image with virtual content information that matches the virtual search criteria.

2. The apparatus of claim 1, wherein the code is further executable by the processor to:
capture the image; and
record the image and the virtual content information.

3. The apparatus of claim 2, the virtual content information further comprises a virtual object source and the code is further executable by the processor to determine the virtual object source.

4. The apparatus of claim 2, the virtual content information further comprises a virtual object number and the code is further executable by the processor to determine the virtual object number.

5. The apparatus of claim 2, the virtual content information further comprises a virtual information quantity and the code is further executable by the processor to determine the virtual information quantity.

6. The apparatus of claim 2, the virtual content information further comprises a virtual object time stamp and the code is further executable by the processor to determine the virtual object time stamp.

7. A method comprising:
determining by use of a processor, a source of each pixel of an image as from a real object or virtual content, wherein the image comprises both real objects and virtual content;
determining a virtual object contour for the virtual content, wherein each virtual object contour is a model that outlines the virtual content in the image and comprises no more than a specified number of geometric shapes;
searching, virtual content information for a plurality of stored images using virtual search criteria, wherein the virtual content information and virtual search criteria are vectors with a binary value asserted for each geometric shape of a corresponding virtual object contour; and
retrieving a stored image with virtual content information that matches the virtual search criteria.

8. The method of claim 7, the method further comprising:
capturing the image; and
recording the image and the virtual content information.

9. The method of claim 8, the virtual content information further comprises a virtual object source and the method further comprising determining the virtual object source.

10. The method of claim 8, the virtual content information further comprises a virtual object number and the method further comprising determining the virtual object number.

11. The method of claim 8, the virtual content information further comprises a virtual information quantity and the method further comprising determining the virtual information quantity.

12. The method of claim 8, the virtual content information further comprises a virtual object time stamp and the method further comprising determining the virtual object time stamp.

13. A program product comprising a computer readable storage medium that stores code executable by a processor, the executable code comprising code to:
determine a source of each pixel of an images as from a real object or virtual content, wherein the image comprises both real objects and virtual content;
determine a virtual object contour for the virtual content, wherein each virtual object contour is a model that outlines the virtual content in the image and comprises no more than a specified number of geometric shapes;
search virtual content information for a plurality of stored images using virtual search criteria, wherein the virtual content information and virtual search criteria are vectors with a binary value asserted for each geometric shape of a corresponding virtual object contour; and
retrieve a stored image with virtual content information the matches the virtual search criteria.

14. The program product of claim 13, wherein the code is further executable by the processor to:
capture the image; and
record the image and the virtual content information.

15. The program product of claim 14, the virtual content information further comprises a virtual object source and the code is further executable by the processor to determine the virtual object source.

16. The program product of claim 14, the virtual content information further comprises a virtual object number and the code is further executable by the processor to determine the virtual object number.

17. The program product of claim 14, the virtual content information further comprises a virtual information quantity and the code is further executable by the processor to determine the virtual information quantity.

18. The program product of claim 14, the virtual content information further comprises a virtual object time stamp and the code is further executable by the processor to determine the virtual object time stamp.

* * * * *